United States Patent [19]

Rohrer

[11] 3,845,789

[45] Nov. 5, 1974

[54] SUB-SURFACE GAS MAIN REPLACEMENT METHOD

[76] Inventor: Carl H. Rohrer, 1501 Hale Ave., Ft. Wayne, Ind. 46804

[22] Filed: Oct. 30, 1972

[21] Appl. No.: 302,053

[52] U.S. Cl. .................................................. 138/97
[51] Int. Cl. ............................................ F16l 55/12
[58] Field of Search ........................ 138/93, 97, 114

[56] References Cited
UNITED STATES PATENTS

| | | | |
|---|---|---|---|
| 3,294,121 | 12/1966 | Powell et al. ...................... | 138/93 X |
| 3,602,263 | 8/1971 | Bremner .............................. | 138/97 |
| 3,688,801 | 9/1972 | Rohrer ................................. | 138/97 |

Primary Examiner—Charles A. Ruehl
Attorney, Agent, or Firm—Woodard, Weikart, Emhardt & Naughton

[57] ABSTRACT

Disclosed is a method for replacing sub-surface gas mains by isolating a section of the main to which service lines are attached, providing an independent gas supply to the isolated section, inserting a smaller diameter main-replacing tube into the isolated main section and providing and independent gas supply to the interior of the tube so that a dual, independent gas supply is provided, one in the annular space between the main and the tube and another within the tube. The service lines are then, one-by-one or in groups as desired, disconnected from communication with the annular space and placed in communication with the interior of the replacement tube without substantial customer service interruption. The operation is repeated for further sections of the main to be replaced.

4 Claims, 7 Drawing Figures

SUB-SURFACE GAS MAIN REPLACEMENT METHOD

Replacement of sub-surface, cast iron and steel gas mains has become a matter of increasing importance to utility companies. Old mains, put down many years ago, develop leaks, cast iron mains, particularly, develop leaks at caulked joints and tend to fracture as a result of street traffic vibration and ground movement caused by frost action. U.S. Department of Transportation regulations currently require that all bare steel pipe which cannot be cathodically protected must be replaced.

Replacement of gas main sections by inserting in the old main a length of pipe formed of polyethylene or other suitable material, of smaller diameter than the original main, is a method of replacement which has come into increasing use. The replacement is made in sectional increments, gas is supplied at somewhat higher pressure to the smaller diameter, plastic replacement pipe to maintain capacity, and to old main may be left in place as a protective covering for the new main. A difficulty in this procedure results from the frequent necessity of blocking auto traffic and shutting down gas use by some 15 to 30 users along the main section (usually 300 to 500 feet in length) to be replaced. Customers must be notified in advance the date and estimated duration of the shut-down. All preliminary work prior to the shut-down must have been completed prior to the shut-down date such as digging up the service lines adjacent their main connection and preparing for installation of pressure regulators ahead of the customer' gas appliances. Early in the morning of the shut-down day a sufficient number of crews, material and machinery must be present at the job site and the gas supply to all affected customers is shut off at their meters. Gas supply to the main section to be replaced is shut off and the service lines are then disconnected at the main and a piece of the old main about 3 feet in length is broken or cut out at each service connection. A suitable length of plastic pipe is inserted into the isolated section of the old main. The service lines to customers along the main section are tested and renewed if necessary and connected to the new plastic main. Gas pressure is introduced into the plastic replacement section, customers' meters are turned on and the customers are put back into service.

It is important to note that in the prior art procedure described above all connections to the new main for all service lines along the replacement section must be completed before the work can be halted because the old main has become unusuable throughout the replacement operation. The work must proceed through inclement weather, and, because of the equipment which must be massed at the site, the adjacent street of alley frequently must be blocked. The season or weather interval in which this type of replacement can be made cannot be extended into cool weather periods because customers using gas for domestic or space heating cannot be left without gas service for more than an hour or two during cold weather.

The method of the present invention meets this problem by inserting the plastic, replacement pipe into a section of gas main without removing the gas pressure from the section, then supplying gas pressure to the interior of the replacement pipe, and, in effect, thus providing a dual gas supply, one in the annular space between the old main and the inserted pipe and the other within the inserted pipe. The service lines from the old main section are supplied with gas from the annular space until they are transferred, one-by-one or in groups if desired, to communication with the interior of the inserted, replacement pipe. Each customer's gas supply need only be shut off during the short interval in which his particular service line is being transferred over from the annular space to the replacement pipe. Further, and of even greater advantage, all of the 15 to 30 service line transfers in a typical replacement section need not be performed in one uninterrupted work interval, such as a single day, since gas can be supplied through both the annular space of the old main and the interior of the inserted pipe simultaneously. It permits customers to be transferred one or two or more at a time from the old main to the new replacement main, and delays between such transfers can be tolerated. Smaller numbers of crews and less equipment need be placed at the transfer site and street or alley obstruction is held at a minimum.

The present application also discloses a form of circular seal which is particularly adapted for sealing the ends of the annular space between the old main and the inserted pipe in carrying out the dual gas supply method described above.

DESCRIPTION OF THE PREFERRED EMBODIMENT

Figure 1:
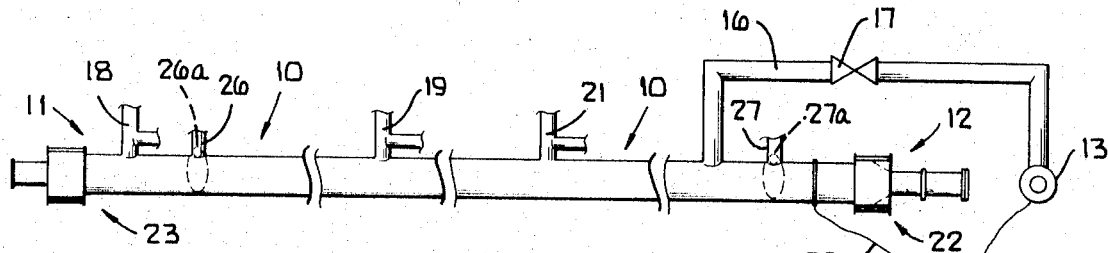
FIG. 1 is a schematic view of a section of gas main undergoing replacement.

Referring initially to FIG. 1 there is shown, a section of cast iron gas main, identified at 10 which is to be replaced and which has been excavated exposing its left hand end 11 and its right hand end 12, the main section having been disconnected from the additional portion of the complete main which, as shown in FIG. 1, extends at a right angle to the main section 10 and is identified at 13. After excavation of the main section at its ends, but before it is disconnected from the remainder of the gas main 13, a by-pass line 16 is provided from the main 13 to the section 10, controlled by a valve schematically illustrated at 17, the by-pass providing a gas supply to the main section and permitting this section of the main to be disconnected or isolated from the remaining portion of the main 13.

As may be seen in FIG. 1, the section 10 of the gas main to be replaced has a plurality of service tees 18, 19 and 21 to which customer service lines (not shown) are connected and serving to supply gas to customers along the main section 10. The closed ends of the main section 10 are provided with a capped reducing line sleeve 22 at the section end identified at 12 and with a closed transition fitting 23 at the end identified at 11. It will be noted that the isolating of the main section 10, with the by-pass 16 in place, and the closing of the ends of the main section 10 by the fittings 22 and 23 all occur without interruption of gas pressure in the main section 10 and, consequently in the service lines 18, 19 and 21. Customer service is not cut off during this initial preparatory step. Subsequent to the installing of the by-pass line 16 between the gas main 13 and the main section 10 to be replaced, bag tap openings identified at 26 and 27 are made adjacent the ends of the section 10 and conventional, inflatable, bag stoppers are threaded into the opening, the bag stoppers being indicated schematically at 26a and 27a. These structures are essentially a hand operated pneumatic pump with an inflatable bag which extends into the pipe to be stopped, the inflated condition of the bag, sealing the main closed being illustrated in broken lines in FIG. 1. By inflating (referred to as "lowering") the bag, the main may be stopped, while upon deflating of the bag (referred to as "raising"), the main may be reopened. If gas to be supplied through the replacement main is to be at a substantially higher pressure than that originally supplied through the main section to be replaced, then pressure relieving devices (not shown) should be installed in communication with the annular space between the replacement main and the old main so that in the event of a leak occurring in the replacement plastic main, customers' appliances will not be overpressured during the time they are still connected to the main to be replaced. If desired, service pressure regulators may be installed at the meters on the service lines served by the gas main section 10. If this is done prior to testing, installation of pressure relieving devices will not be necessary. Bonding cable 28 may also be installed between the main 13 and the main section 10.

Figure 2:
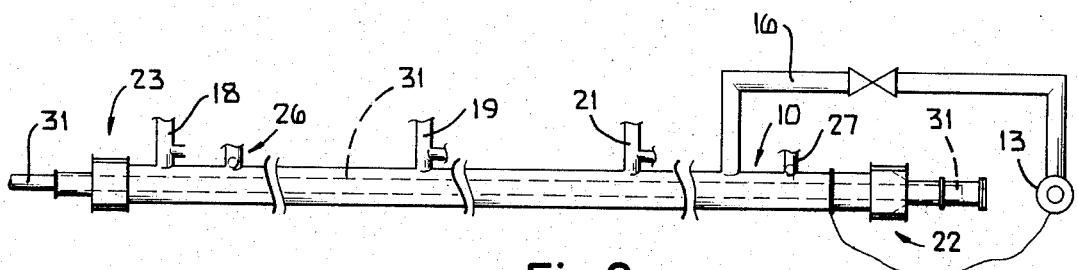
FIG. 2 is a view similar to FIG. 1 but showing further progress in the method of replacing the gas main.

Subsequently, as indicated in FIG. 2, the end closure nipple is removed from the transition fitting 23 and replaced by a nipple containing a rubber gasket having a central aperture which can be enlarged by insertion of the plastic replacement tube 31 which is inserted into the old main section 10 through the fitting 23. At the opposite end of the main section, a similar rubber gasket is installed in the fitting 22 to receive and guide the end of the plastic tube 31 as it completes its movement through the main section 10. Anyone of several means may be used for inserting the tube 31 in the main section 10 such as initially inserting a fiber glass rod through the main section, attaching a rope or cable to the rod, then again drawing the cable through the main section after having attached to it the end of the plastic tube 31, or, in some applications the tube may be simply pushed through the fitting 23 and into the small chamber attached to fitting 22. Where the tube is merely pushed through, the fitting 22 is, of course, maintained closed during the insertion. The bag components of the bag stoppers 26 and 27 are raised into their receiving cylinders as the tube 31 is inserted through the main 10 so that they do not obstruct insertion of the tube. After insertion of the plastic tube 31 as shown in FIG. 2, gas continues to be supplied to the service lines 18, 19 and 21 through the annular space between the outer surface of the tube 31 and the inner surface of the gas main section 10. It will be understood that during the placement of the apertured rubber gaskets in the fittings 23 and 22, the bag stoppers 26 and 27 will be lowered to prevent gas from escaping from ends of main 10.

Figure 3:
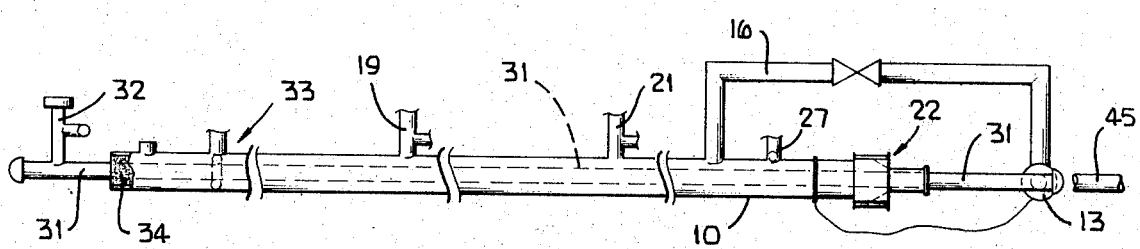
FIG. 3 is a view similar to FIG. 2 and showing further progress in applying the method of the present invention.
Figure 4:
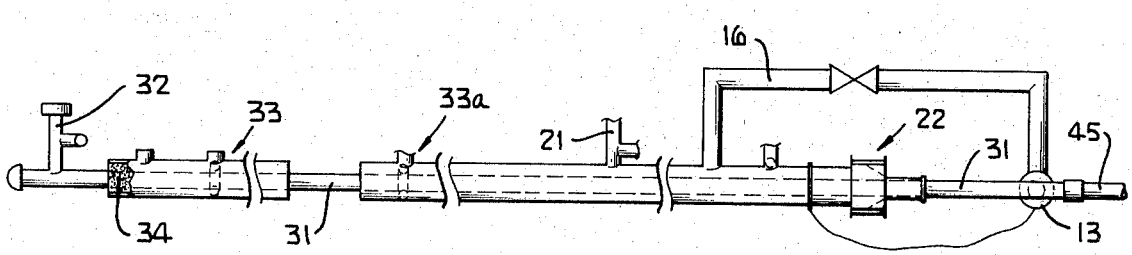
FIG. 4 is a view similar to FIG. 3 but showing a further step in the method of replacing the gas main section.
Figure 5:
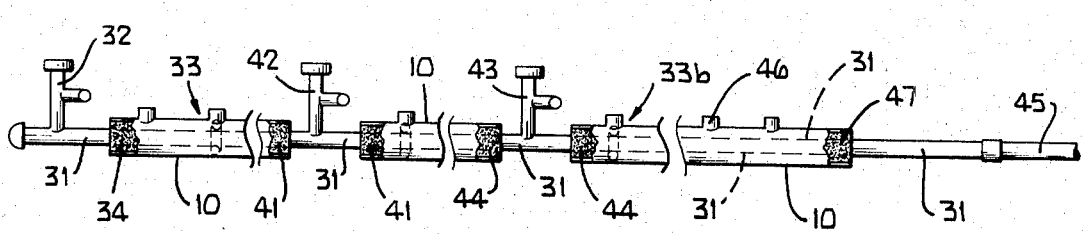
FIG. 5 is a view similar to FIG. 4 but showing the gas main after completion of the replacement process of the present invention.

As may be seen in FIG. 3, after insertion of the plastic tube 31 is completed, its ends are capped. Prior to capping the tube 31, a new plastic service tee 32 may be installed on the tube, this service tee 32 eventually replacing the service tee connecting the service line 18 to the old main section 10. The tube 31 may be purged with gas through the service tee 32 and, in accord with safety regulations, the interior of the plastic tube 31 may be pressurized to a pressure well above the normal pressure which it will sustain in service, this temporary testing at high pressure assuring that the replacement main tube 31 is ready for service. A circular or annular seal indicated schematically at 33 is then inserted into the aperture in the main 10 which previously accommodated the bag stopper 26, the bag stopper apparatus having been removed at completion of the insertion of the tube 31. The circular seal is shown in detail in FIGS. 6 and 7 and consists of a flexible tube 34, formed of rubber or a similar elastomer, which has a reduced cross-section end portion 34a. A wedge-shaped rubber element 34b is attached to the tube adjacent the reduced portion 34a, or the space may be filled with a caulking compound or other suitable material in place of the rubber wedge. The annular seal is installed by first removing the plug from the capped aperture in the main 10 which has been placed on the aperture after removal of the bag stopper 26. The opening in the gas main 10 is then covered with a rubber gasket having a small aperture in it through which butyl rubber caulking compound, or any suitable non-hardening caulking material, is pumped until the tapped aperture seals. A stainless steel radiator clamp about seven sixteenth inches wide and 0.027 inches thick or the equivalent is pushed through the caulking compound around the annular space. Holding the flat band firmly so its seven sixteenth inches width is parallel to the pipe will insure the end appearing at the hole, where a wire can be attached to the band and then may be threaded through the caulking compound and around the annular space between the main section 10 and the tube 31, and looped through the aperture. The larger end portion of the tube may be attached to one end of the wire and the wire pulled through the aperture back around the tube 31 placing the tube in its installed position of FIG. 6. After the tube is in place, caulking compound is pumped into the interior of the tube, in effect, inflating the tube into sealing position and the end of the tube 34a is clamped when the tube has been filled with caulking compound. More caulking compound is then pumped into the tube under pressure and the tube is thus inflated into sealing position. Instead of a non-hardening material such as caulking compound, a fast hardening material such as plaster of paris or the like may be used to fill the tube. After the circular seal 33 is in place in the main section 10 as shown in FIG. 3, the service line connected to the service tee 18 having previously been disconnected, the tee 18 is removed for salvage and the fitting 23 (FIG. 2) is removed from the end of the old main section 10. The annular space exposed by removal of the fitting 23 is filled with a hardening material to close it as shown at 34 in FIG. 3. The end of the plastic tube 31 is now tied into communication with the gas supply provided by a source of gas supply for the new replacement system such as the higher pressure gas main 45 (FIGS. 3–5). This gas main 45 supplies gas at somewhat higher pressure to the smaller diameter, plastic replacement pipe 31 to thus maintain supply capacity. The service line previously connected to the service tee 18 is now connected to the new service tee 32, attached to the plastic tube 31, and service to the customer at the service line, which had been temporarily interrupted at the installation of the annular seal 26, is now resumed through the service tee 32. The customers at service lines 19 and 21 continue to be supplied with gas through the annular space between the tube and the main section 10 while the customer at the new service tee 32 is supplied by gas through the new plastic replacement main section 31. A dual gas supply is thus provided in this transition period and should weather or other delaying factors make it necessary, the subsequent connection of the service lines 19 and 21 to the new main can be delayed for the required time interval without interrupting service to the customers served by the service lines branching from the main section 10. As shown at 34 in FIG. 4 the annular area around the end of the old main section 10 and the tube 31 may be sealed with plaster of paris or any other suitable hardening material.

Referring to FIGS. 3 and 4, the customer whose service line is connected to the service tee 19 can next be transferred from the gas supply in the annular space between the main 10 and the tube 31 to the gas supplied through the tube 31. This customer is taken out of service and the service tee 19 removed. A circular seal 33 is placed in the annular space within the old main surrounding the tube 31. The seal is identified schematically at 33a in FIG. 4 and is identical to the seal 33 previously described with reference to FIGS. 6 and 7. The presence of the circular seal 33a, in sealing position, blocks gas from the annular space downstream or leftwardly from the circular seal 33a as viewed in FIG. 4. Subsequently, a section of the old main, leftwardly of the seal 33a, is cut out and removed and the annular space at the opposed open ends of the main are sealed by a suitable hardening material as indicated at 41 in FIG. 5. A new plastic service tee, identified at 42 in FIG. 5 can then be installed on the exposed portion of the central tube 31 and the service line previously connected to the now removed service tee 19 is reconnected to the service tee 42 and this customer is placed back in service, receiving his gas supply from the tube 31.

Returning again to FIG. 4, after whatever time interval may be necessary or advantageous, the service line connected to the service tee 21, providing gas to the final customer on the main section 10 may be placed in communication with the interior of the tube 31. This is accomplished by repeating the process described with reference to the service tee 19. A circular seal 33b, identical to the seal identified at 33 and 33a in FIG. 4, is inserted in the opening from which the service tee 21 has been removed. This serves to seal gas pressure from the annular space leftwardly of the seal member 33b. A portion of the old main is then broken away and a new service tee 43 is installed on the exposed portion of the tube 31. The opposed, open ends of the main section 10 are filled with a suitable hardening material as indicated at 44 in FIG. 5. The service line, previously connected to the service tee 21, is now connected to the new service tee 43 and the customer served by this service line is placed back in operation.

Since no customer is now served by a gas supply from the annular space between the main section 10 and the tube 31, the by-pass 16 may now be removed and the opening capped as indicated at 46. The annular space at the open end of the tube section 10 may be filled with a suitable hardening material as indicated at 47. Subsequently, further main sections may be isolated, provided with an inserted plastic tube, and service lines connected one-by-one from communication with the old main section to the replacement tube section as described above.

Figure 6:
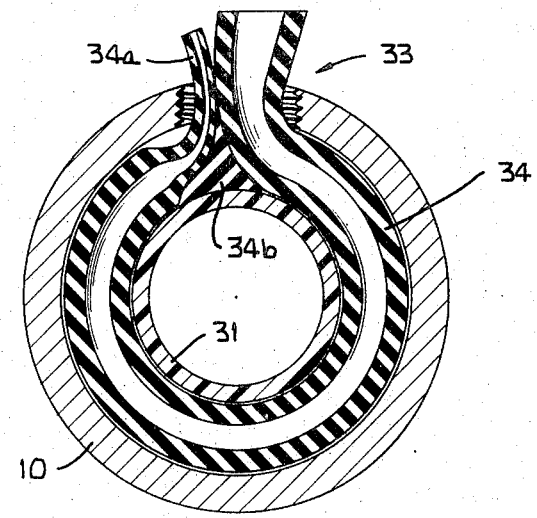
FIG. 6 is a sectional view showing the circular seal structure used in the method described with reference to FIGS. 1–5.
Figure 7:
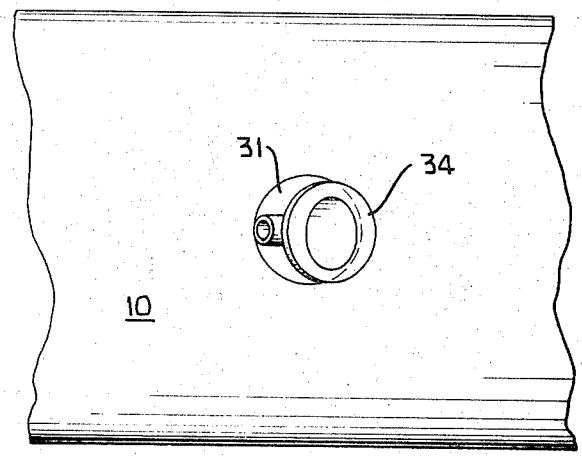
FIG. 7 is a fragmentary, top plan view of the structure shown in FIG. 6 with the sealing tube shown in section.

The seal assembly described in detail with reference to FIGS. 6 and 7 will be recognized as one means for providing the necessary seal adjacent the service tee to be removed and that other forms of sealing this annular space between the main section 10 and the tube 31 at the service tee might be utilized. For example, after removal of the service tee a nozzle may be inserted into the aperture and polyurethane foam, or a foaming material of similar characteristics, may be sprayed into the annular space between the main section 10 and the pipe 31 to form a tight cellular plug in the annular space having a length of approximately 18 inches. Alternatively a separate opening for admission of the nozzle may be made in the main 10. The hardened plug thus formed prevents the flow of gas from one portion of the annular space to the adjacent portion and also stops gas flow through the service tee aperture. After the foam is in place, a portion of the main section 10, somewhat less than 18 inches in length, is cut and removed, the section removed including the threaded aperture to which the service tee had been connected. The service line may then be reconnected, through a new service tee, to the replacement main 31. Sufficient foamed material remains in the annular space on either side of the removed section of the old main to prevent flow of gas from the annular space. Using this alternate procedure, it may be at times necessary to use a centering device to hold the plastic pipe in position in the center of the main into which the plastic pipe has been inserted.

After insertion of the replacement tube in the old main section and while the annular space between the tube and the main is supplied with gas through the by-pass line 16 (as shown in FIG. 3), it may be desireable (to achieve greater flexibility in choosing the sequence of replacement of the individual service tees) to provide a two-way gas feed to the annular space. This can easily be done by connecting the end of the plastic tube (the left hand end as viewed in FIG. 3) to the annular space. This connection may be through a pressure regulator if the pressure of the gas fed to the plastic tube through supply 45 is higher than that of the gas fed through the connecting line 16. Completion of this connection thus provides a gas feed to the annular space at the opposite end from, and in addition to, the gas feed through by-pass line 16.

I claim:

1. A minimum service shut-down method for replacing sub-surface gas mains of the type having service lines connected at spaced locations along the gas mains, said method including: initially obtaining access to each end of predetermined length section of the main having a plurality of service lines connected to it, providing said section with a gas supply independent of its junction with adjoining portions of the main, subsequently isolating said section from adjoining portions of the main, then inserting within said main section a generally coextensive section of smaller-diameter replacement tube and connecting said tube to a source of pressurized gas supply, subsequently disconnecting less than all of said plurality of service lines from said main section and reconnecting them to said replacement tube with said reconnected service lines being supplied with gas from said replacement tube and the remainder of said service lines being supplied with gas from said main section, subsequently disconnecting said remaining service lines from said main section and reconnecting them to said tube, and finally removing said gas supply from said main section leaving all of said service lines supplied with gas by said replacement tube.

2. The method claimed in claim 1 in which said plurality of service lines connected to said main section are disconnected therefrom and reconnected to said replacement tube one-by-one or in groups along the length of said main section.

3. The method claimed in claim 1 in which each disconnection of a service line from said main section is preceded by the step of sealing off from said gas supply for said main section the portion of the main section closely adjacent its junction with said service line by inserting sealing means in the main section adjacent said junction and breaking out of said main section a portion adjacent said sealing means to expose said replacement tube.

4. The method claimed in claim 1 which includes the step of testing said replacement tube in situ by temporarily raising the gas pressure in said replacement tube to value well above normal service pressure before any of said service lines are disconnected from said main section.

* * * * *